United States Patent [19]

Sugawara

[11] Patent Number: 5,546,101

[45] Date of Patent: Aug. 13, 1996

[54] COLOR DISPLAY UNIT WITH PLASMA DISPLAY PANEL

[75] Inventor: Motoo Sugawara, Kawasaki, Japan

[73] Assignee: Fujitsu General Limited, Kawasaki, Japan

[21] Appl. No.: 201,376

[22] Filed: Feb. 24, 1994

[30] Foreign Application Priority Data

Mar. 2, 1993 [JP] Japan .................................. 5-066094

[51] Int. Cl.$^6$ .............................. G09G 3/28; H04N 5/202
[52] U.S. Cl. ............................... 345/63; 345/72; 345/150; 348/674
[58] Field of Search ................................. 345/60, 63, 65, 345/72, 148, 149, 150, 155; 348/797, 674, 625; H04N 202, 57

[56] References Cited

U.S. PATENT DOCUMENTS

| | | | |
|---|---|---|---|
| 4,020,280 | 4/1977 | Kaneko et al. | 345/148 |
| 5,045,846 | 9/1991 | Gay et al. | 345/72 |
| 5,122,783 | 6/1992 | Bassetti, Jr. | 345/152 |
| 5,187,578 | 2/1993 | Kohgami et al. | 345/148 |
| 5,229,860 | 7/1993 | Kido et al. | 348/625 |
| 5,298,892 | 3/1994 | Shapiro et al. | 345/150 |

*Primary Examiner*—Steven Saras
*Attorney, Agent, or Firm*—Kanesaka & Takeuchi

[57] ABSTRACT

A color display unit which comprises a plasma display panel and a driving device for driving the plasma display panel so that a picture constituted by input R, G and B signals is displayed on the plasma display panel, wherein the color display unit further comprises a device for analog-to-digital converting the input R, G and B signals and for giving gamma correction to the analog-to-digital converted R, G and B signals, so that the driving device drives the plasma display panel on the basis of the gamma-corrected R, G and B signals, the gamma correction having a characteristic in which a gamma value is made larger than 2.2 in a middle portion of a gamma characteristic curve, and, at the same time, the middle portion of the gamma characteristic curve is shifted to a position having a higher luminance level, and white and black foot portions of the gamma characteristic curve are made smooth.

6 Claims, 3 Drawing Sheets

COLOR DISPLAY UNIT WITH PLASMA DISPLAY PANEL

BACKGROUND OF THE INVENTION

The present invention relates to video signal processing and picture display techniques in a display system such as television or the like, and particularly to a color display unit in which the quality (contrast ratio and color reproductivity) of a picture color-displayed on a plasma display panel is improved.

Recently, a plasma display panel is used for a display unit. This plasma display panel is designed so as to have two groups of linear or plane electrodes perpendicularly intersecting each other on two glass plates opposite to each other, and a voltage is applied across only a pair of specified ones of the electrodes of the respective groups so as to produce plasma at an intersection of the specified electrodes to thereby form a picture element of dot matrix display. In various flat display means, a plasma display panel is superior in realizing a large screen and is capable of performing full color display or high-speed gradation display. Accordingly, a plasma display panel is coming into practical use for a thin-type large-screen color display unit (for example, a display unit for a wall-mounted television set).

However, now a cathode-ray tube (hereinafter abbreviated to "CRT") is mainly used for a color display unit. Such a CRT has a display characteristic in which there is a relationship that when an input signal level and an output signal level (output luminance level) are represented by x and y respectively, y is proportional to the $\gamma$ (gamma)th power of x. Since the value of this gamma ($\gamma$) is substantially equal to 2.2 as shown in FIG. 4, an original signal obtained by a camera or the like on an transmission side is corrected so as to have a reversed characteristic of $\gamma=0.45$.

On the other hand, in a plasma display panel in which half tone display is performed by pulse number modulation, the value of gamma ($\gamma$) is equal to "1" theoretically. That is, generally, a plasma display panel is only in either one of a turned-on state and a turned-off state, and half tone display is controlled by the number of times of turn-on of the plasma display panel in a short period (in one field period). That is, since the number of light emissions of a plasma display panel is proportional to the number of pulses supplied to the plasma display panel, the plasma display panel is subjected to the pulse number modulation with the number of pulses of the input video signal to thereby perform half tone display. Accordingly, if it is intended to perform display equivalent to that of a CRT, it is necessary to perform display after input signals (for example, R, G and B signals) are corrected so as to establish $\gamma=2.2$.

However, in comparison with a CRT, such a plasma display panel used for a color display unit is dimmer, that is, lower in luminous efficiency; smaller in contrast ratio; and smaller in the number of display gradations so that a false outline is apt to be produced. If the number of display gradations is increased, the luminance level on the screen is reduced. Further, since the contrast ratio is small as mentioned above, there is a problem that the degree of color saturation of a picture is small, and hence the color reproductivity is poor. Furthermore, the low luminous efficiency, the small contrast ratio, and so on make it difficult to realize a large-screen wall-mounted television set.

SUMMARY OF THE INVENTION

It is therefore an object of the present invention to solve the foregoing problems in the conventional art so as to provide a color display unit in which it is intended to improve the contrast ratio of a picture to be displayed on a plasma display panel, to improve the luminance level on the screen, and to thereby make the color reproductivity superior.

In order to attain the foregoing object, according to an aspect of the present invention, a color display unit comprises: a plasma display panel; a gamma correction means for analog-to-digital converting input R, G and B signals constituting a picture image and for making gamma correction to the digital-converted R, G and B signals, the gamma correction having a characteristic in which a gamma value is made larger than 2.2 in a middle portion of a gamma characteristic curve, and, at the same time, the middle portion of the gamma characteristic curve is shifted to a position having a higher luminance level, and white and black foot portions of the gamma characteristic curve are made smooth; and a driving means for driving the plasma display panel on the basis of the R, G and B signals subjected to gamma correction so that a picture composed of the input R, G and B signals is displayed on the plasma display panel.

According to another aspect of the present invention, a color display unit comprises: a plasma display panel; a chrominance demodulating means for chrominance-demodulating a received video signal into R, G and B signals; an analog-to-digital converting means for analog-to-digital converting each of the R, G and B signals; a gamma correction means for making gamma correction to the analog-to-digital converted R, G and B signals, the gamma correction having a characteristic in which a gamma value is made larger than 2.2 in a middle portion of a gamma characteristic curve, and, at the same time, the middle portion of the gamma characteristic curve is shifted to a position having a higher luminance level, and white and black foot portions of the gamma characteristic curve are made smooth; and a driving means for driving the plasma display panel on the basis of the R, G and B signals subjected to the gamma correction so that a picture constituted by the input R, G and B signals is displayed on the plasma display panel.

Preferably, in the above color display unit, the gamma correction means has a storage means for storing data required for the gamma correction, and for outputting output signals obtained by giving the gamma correction to the analog-to-digital converted R, G and B signals when the storage means is supplied with the analog-to-digital converted R, G and B signals, so that the driving means drives the plasma display panel on the basis of the output signals of the storage means.

Preferably, in the above color display unit, the storage means is a read only memory in which data required for the gamma correction are stored in advance.

In the above-mentioned configuration, since the correction characteristic is set so that the gamma value at the middle portion of the gamma characteristic curve is larger than 2.2, the contrast ratio of the middle level on which attention is most given on the screen of the plasma display panel is enlarged. In addition, since the middle portion of the gamma characteristic curve is shifted to a position having a higher luminance level on the screen, the luminance level of the screen is made high to increase the average luminance of the screen.

The gamma value at the above-mentioned middle portion of the gamma characteristic and the position of the same characteristic curve are limited by the collapse of black and white and the tolerance of false outlines of black and white portions, and the white and black foot portions of the gamma characteristic curve are made smooth.

Other features and advantages of the present invention will be apparent from the following description taken in connection with the accompanying drawings.

DESCRIPTION OF THE PREFERABLE EMBODIMENTS

Now, embodiments of the present invention will be described in detail under.

In a color display unit according to the present invention, when a picture composed of input R, G and B signals is displayed on a plasma display panel (hereinafter abbreviated to "PDP"), each of the R, G and B signals is subjected to digital conversion and gamma correction, and the PDP is driven by these signals subjected to the gamma correction. At this time, the gamma correction is performed with data in which a middle portion of a gamma characteristic curve is made to have a gamma value larger than 2.2, and, at the same time, the middle portion is shifted to come to a position having a higher luminance level on the screen, and the white and black foot portions of the gamma characteristic curve are made smooth.

Figure 1:
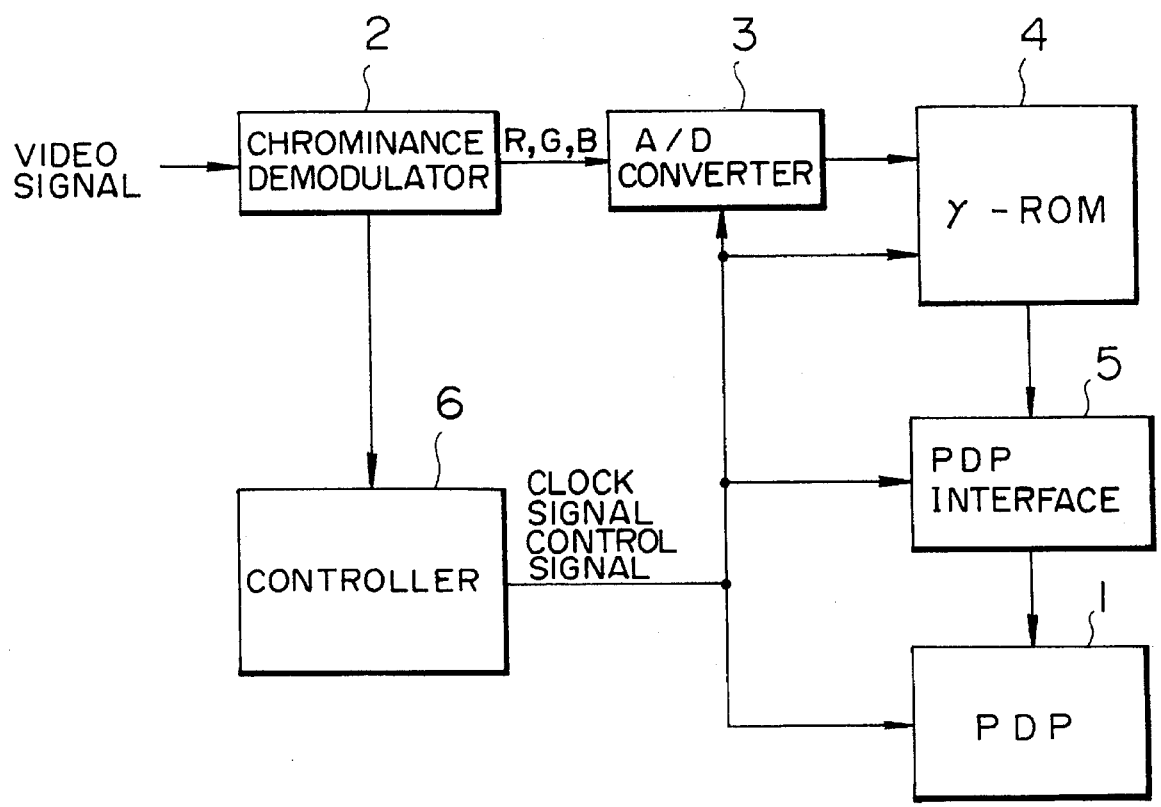
FIG. 1 is a schematic block diagram illustrating an embodiment of the color display unit according to the present invention.

To this end, as shown in FIG. 1, the color display unit according to the present invention is provided with a PDP 1 for displaying, for example, a picture of a composite video signal composed of R, G and B signals and a synchronizing signal, a chrominance demodulator 2 for converting the video signal into R, G and B signals and, at the same time, for separating a synchronizing signal out of the video signal, an A/D converter 3 for analog-to-digital converting these converted R, G and B signals respectively, a γ-ROM (storage means) 4 which is supplied with these digital-converted R, G and B signals from the A/D converter 3 and outputs corrected R, G and B signals obtained by applying gamma correction to the inputted digital-converted R, G and B signals, a PDP interface 5 including a controller and so on for driving the PDP 1 on the base of the gamma-corrected R, G and B signals supplied from the γ-ROM 4, and a controller 6 for generating clock signals and control signals for timing and controlling the operations of the A/D converter 3, the γ-ROM 4, the PDP interface 5, and so on, on the basis of the synchronizing signal supplied from the chrominance demodulator 2.

Figure 2:
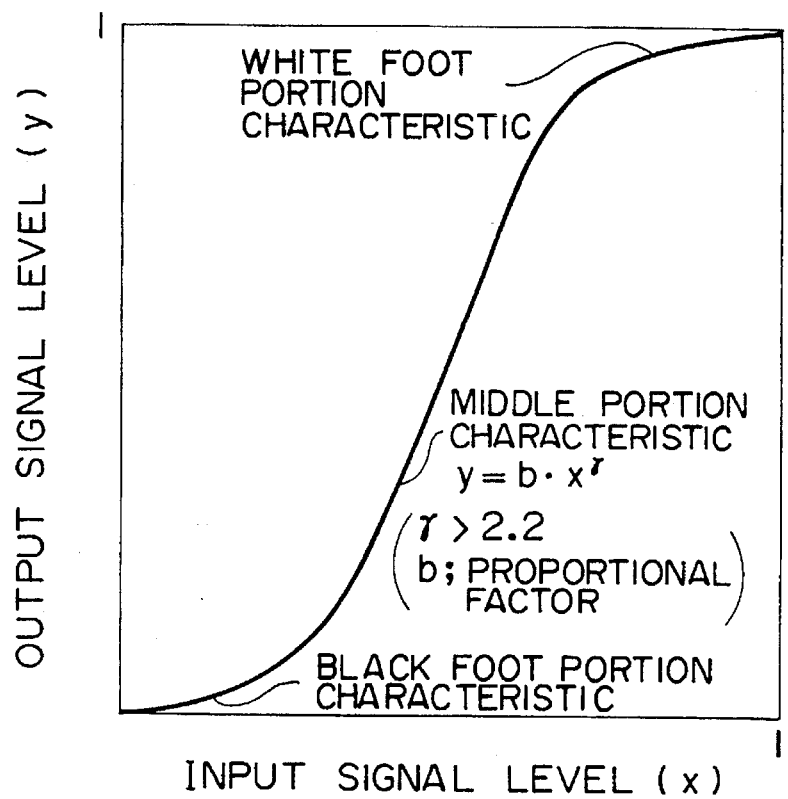
FIG. 2 is a schematic graph of a gamma characteristic curve used in the color display unit shown in FIG. 1.
Figure 3:
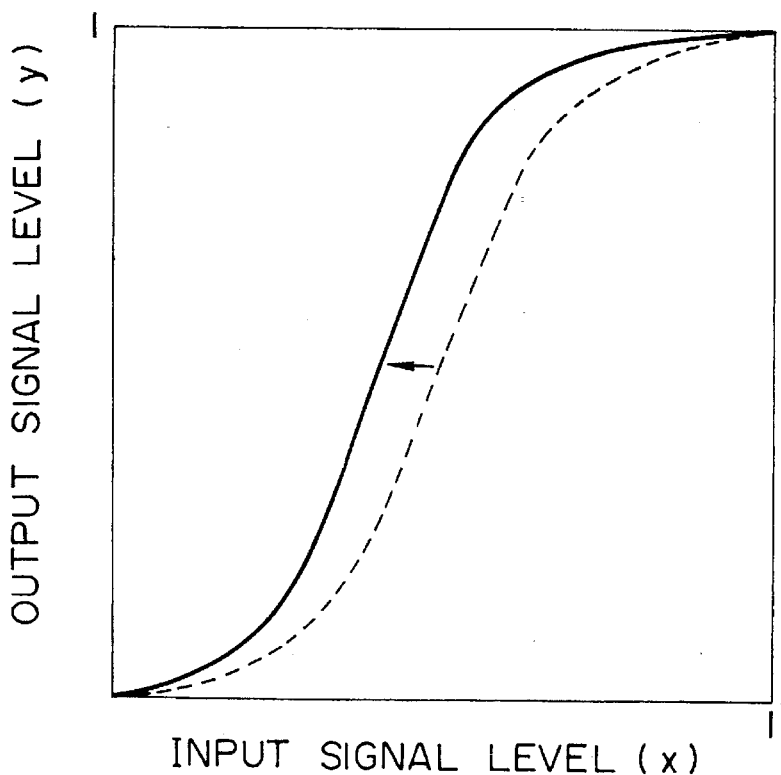
FIG. 3 is a schematic graph of a gamma characteristic curve used in the color display unit shown in FIG. 1.
Figure 4:
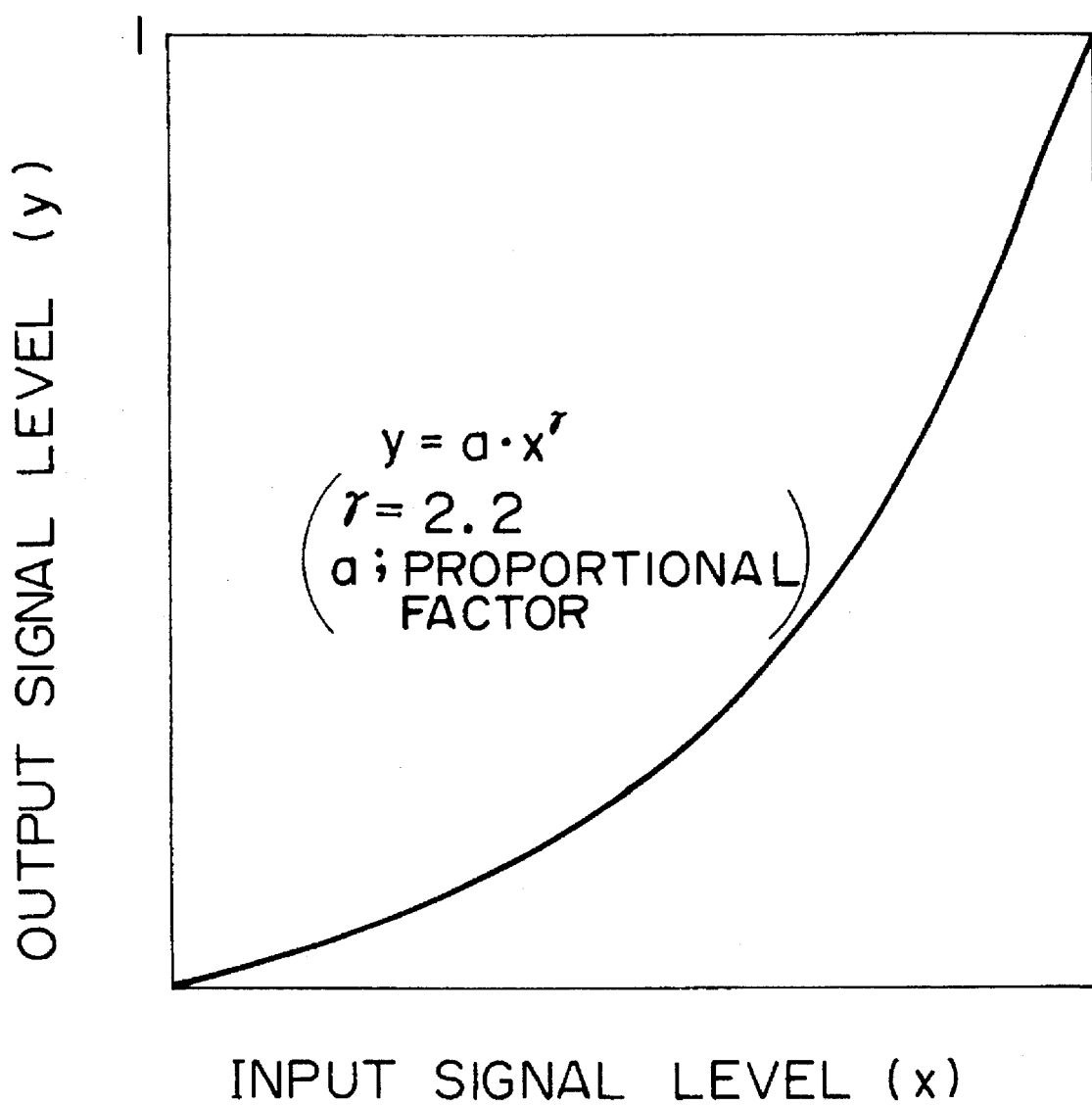
FIG. 4 is a schematic graph of a gamma characteristic curve used in a conventional color display unit.

In the γ-ROM 4, data required for gamma correction is stored in advance. In the gamma correction, the contrast ratio of the middle level upon which attention is given extremely on the screen of the PDP 1 is improved, and the gamma value corresponding to the luminance level on the same screen is made to be as large as possible within a range in which black and white of a picture are not collapsed, and within a range of tolerance limits in which any false outline of the picture is not so remarkable. The words "middle level" used herein means a level at a position, for example, in FIG. 2, in which an input signal level x is about ½ when the maximum value of x is assumed to be "1" (that is, the level corresponding to the middle portion of the gamma characteristic curve of FIG. 2). On the display screen, the "middle level" corresponds to a portion where the brightness is middle between highest and lowest in brightness. To this end, as shown in FIG. 2, the γ-ROM 4 stores γ-correction data in which the gamma value at the middle portion of a gamma characteristic curve is set to be larger than 2.2, for example, 3, and at the same time, as shown in FIG. 3, the middle portion of the gamma characteristic curve is shifted to a position having a higher luminance level on the screen. The smoothness of the white and black foot portions of the gamma characteristic curve may be realized, for example, by making the gamma correction data have a biquadratic curve.

Next, the operation of the color display unit having the above-mentioned configuration will be described with reference to FIG. 3. First, assume that a video signal of a picture to be displayed on the PDP 1 is being supplied into the chrominance demodulator 2. The R, G and B signals of the input video signal demodulated by the chrominance demodulator 2 are converted into digital signals in the A/D converter 3 respectively, and the data stored in the γ-ROM 4 is read out by use of these digital signals as address signals. Since the above-mentioned gamma correction data are stored in this γ-ROM 4 in advance, gamma-corrected signals may be read out in the form of data from the γ-ROM 4. These output data are supplied to the PDP interface 5 which is a controller for the PDP 1, so that the PDP 1 is driven on the basis of the above-mentioned gamma-corrected signals.

At this time, the data for deciding the gamma characteristics in the γ-ROM 4 are such that the gamma value at the middle portion of the gamma characteristic curve is set to be larger than 2.2, for example 3, (the broken line curve in FIG. 3 which is the same as the solid line curve in FIG. 2) to thereby enlarge the contrast ratio of the middle level which is most remarkable on the screen of the PDP 1. This is because in most cases of ordinary television pictures, the lens aperture of a camera is adjusted so that the brightness at a portion at which attention is given or at which it is intended to give intensive expression on the screen is made to have an optimum value (that is, in the vicinity of the middle level).

In addition, as shown by an arrow in FIG. 3, the middle portion of the gamma characteristic curve is shifted leftward in the same drawing (from the broken line curve to the solid line curve in FIG. 3), that is, the middle portion of the characteristic is shifted to a position having a higher luminance level on the screen, and the white and black foot portions of the gamma characteristic curve are made smooth (as shown by the solid line curve in FIG. 3). Accordingly, the average luminance of the screen of the PDP 1 becomes large, and the color saturation of the picture on the screen also becomes large, so that the picture can be displayed with clear colors.

Also with the above-mentioned effect, for example, in the case of 256 gradations, false outlines can be reduced in the middle level of the picture displayed on the PDP 1, that is, the outlines of faces or the like can be improved.

Thus, by use of the data stored in the γ-ROM 4 in which the gamma value at the middle portion of the gamma characteristic curve is set to be large to 3, it is possible to enlarge the contrast ratio of the screen. In addition, by shifting the middle portion of the gamma characteristic curve to a position having a higher luminance level, it is possible to increase the average luminance of the screen. As a result, the degree of color saturation is increased so that it is possible to improve the color reproductivity of a picture. Accordingly, a color display unit with a plasma display panel can be used for a large-screen wall-mounted television set.

Although gamma correction is performed by use of the γ-ROM 4 in the above-mentioned embodiment, similar effects can be obtained even in the case where the γ-ROM 4 is replaced by a suitable arithmetic means and the arithmetic means makes an arithmetic operation to obtain γ-correction data every time when the arithmetic means is supplied with a signal from the A/D converter 3, so that gamma correction is performed with the obtained γ-correction data.

As has been described above, according to the present invention, in a color display unit in which when a picture composed of input R, G and B signals is displayed on a plasma display panel, the input R, G and B signals are subjected to digital conversion and gamma correction respectively so that the plasma display panel is driven on the basis of the gamma-corrected signals, the gamma correction is performed with data in which a gamma value is made larger than 2.2 in the middle portion of a gamma characteristic curve, and, at the same time, the middle portion of the gamma characteristic curve is shifted to a position having a higher luminance level, and the white and black foot portions of the gamma characteristic curve are made smooth. Accordingly, it is possible to improve the contrast ratio of the middle level at which attention is given extremely on the screen of the plasma display panel, and it is possible to improve the average luminance level of the screen. As a result, it is possible to increase the degree of color saturation of a picture, so that it is possible to realize clear color display (it is possible to improve the color reproductivity), and it is possible to reduce false outlines at the middle level.

I claim:

1. A color display unit comprising:

a plasma display panel, an analog-to-digital converter for converting input R, G and B signals constituting a picture image to digital signals, means for providing gamma correction to said digital-converted R, G and B signals, said means correcting a gamma characteristic curve having a middle portion and white and black foot portions such that said middle portion has a gamma value of more than 2.2; the middle portion with the gamma value of more than 2.2 is shifted substantially as it is to a position having a higher luminance level; and the white and black foot portions extend smoothly from the shifted middle portion along a biquadratic curve so that the white foot portion is greater than the black foot portion, driving means for driving said plasma display panel on the basis of said R, G and B signals subject to the gamma correction so that a picture composed of the input R, G and B signals is improved in a contrast ratio of a middle level and an average luminance level, and is displayed on the plasma display panel.

2. A color display unit according to claim 1, further comprising chrominance demodulating means for chrominance-demodulating a received video signal into the R, G and B signals, which are fed to the analog-to-digital converter.

3. A color display unit according to claim 2, wherein said gamma correction means includes a storage means for storing data required for said gamma correction, and for outputting output signals by providing said gamma correction to said analog-to-digital converted R, G and B signals when said storage means is supplied with said analog-to-digital converted R, G and B signals, so that said driving means drives said plasma display panel on the basis of said output signals of said storage means.

4. A color display unit according to claim 3, wherein said storage means is a read only memory in which data required for said gamma correction are stored in advance.

5. A color display unit according to claim 1, wherein said gamma value is 3.0.

6. A color display unit according to claim 1, wherein said middle portion of the gamma characteristic curve is shifted to a low input signal level in a graph of input and output signal levels showing the gamma characteristic curve.

\* \* \* \* \*